United States Patent Office 3,806,551
Patented Apr. 23, 1974

3,806,551
REACTION OF ALLENIC HYDROCARBON WITH FORMALDEHYDE UNDER NON-ACIDIC CONDITIONS TO PRODUCE AN UNSATURATED ALCOHOL
Roe Calvin Blume, Wilmington, Del., assignor to E. I. du Pont de Nemours and Company, Wilmington, Del.
No Drawing. Filed Mar. 2, 1972, Ser. No. 231,395
Int. Cl. C07c 31/02, 33/02, 33/06
U.S. Cl. 260—638 R    7 Claims

ABSTRACT OF THE DISCLOSURE

Allenic hydrocarbons having at least 4 carbons are reacted with formaldehyde under neutral or basic conditions at 135–220° C. to give hydroxymethyl derivatives. From tetramethylallene, a novel alcohol is obtained whose esters are useful as plasticizers and whose dehydration product is a new triene homopolymerizable to either an elastomeric material or a nonelastomeric material.

BACKGROUND OF THE INVENTION

Field of the invention

This invention concerns the production of unsaturated alcohols by reacting an allenic hydrocarbon with formaldehyde under nonacidic conditions.

Description of prior art

Formaldehyde is known to react with unsaturated compounds. With ethylenic compounds, e.g. propylene, formaldehyde gives butane-1,3-diol in the presence of acid catalysts. Basic catalysts in the presence of formaldehyde have been used when condensations such as the Cannizzaro or aldol reactions are desired but have not been used for addition to carbon to carbon double bonds.

Description of the invention

It has now been found that a facile way of producing an unsaturated alcohol consists essentially in the step of reacting a compound of the formula $$R^1CH_2-\underset{R^2}{\underset{|}{C}}=C=\underset{R^3}{\underset{|}{C}}-R^4$$

wherein the R groups, alike or different, are selected from the group consisting of hydogen, alkyl and aryl of up to 7 carbon atoms, with at least an equimolar amount of formaldehyde at a temperature of 135–220° C. under neutral or basic conditions. Preferably the sum of the carbons in all of the alkyl and aryl groups is no more than 10 and generally no more than 8.

Allenes included are tetramethylallene (2,4-dimethyl-2,3-pentadiene), tetraethylallene, 1,2-butadiene, 2,3-pentadiene, 3-methyl-1,2-butadiene, 2-methyl-2,3-pentadiene, 1-phenyl-1,2-butadiene, 1-phenyl-2,3-pentadiene, and 2-phenyl-2, 3-butadiene. Preferred is tetramethylallene from which may be obtained the novel alcohol 2-isopropenyl-3-methyl-2-buten-1-ol, and in turn, a dehydration product 2,4-dimethyl-3-methylene-1,4-pentadiene.

Tetramethylallene is readily available by thermal cracking of dimethylketene dimer. Other allenes 1,2-dienes) are available by the procedures known to the art (e.g., as summarized by Sandler and Karo "Organic Functional Group Preparations," Academic Press, New York, 1971). Methods for the production of allenes include reaction of an olefin with a trihalomethane with a base such as potassium tertiary butoxide to give a cyclopropane followed by treatment with methyllithium. A further process involves treatment of an olefin with tetrabromomethane and methyllithium.

The reaction of the invention must be carried out under neutral or basic conditions since it does not occur in an acidic environment. A convenient method for the introduction of formaldehyde to the allene is to employ a base polymerized polyformaldehyde from which formaldehyde is generated at the temperature employed in the reaction. Other varieties of polyformaldehyde, even those containing acids, are suitable if sufficient quantity of an acid acceptor, suitably 1,8-bis-(dimethylamino)-naphthalene, is present to insure absence of acid during the reaction. However, gaseous formaldehyde can be introduced during the reaction but further equipment, such as pressuring and metering equipment may be needed.

Formaldehyde is generally employed in a molar equivalent amount to that of the allene. The formaldehyde may be present in excess to obtain higher conversions.

The reaction is generally conducted at 150–220° C. Under these conditions, formaldehyde is a gas and pressure is employed to retain it and lower allenes in contact with each other.

The time employed for the reaction depends upon the temperature. In general times of from 1–10 hours are used.

The reaction involved may be represented by the equation:

$$R^1CH_2-\underset{R^2}{\underset{|}{C}}=C=\underset{R^3}{\underset{|}{C}}-R^4 + CH_2O \longrightarrow R^1CH=\underset{R^2}{\underset{|}{C}}-\overset{CH_2OH}{\underset{|}{C}}=\underset{R^3}{\underset{|}{C}}-R^4$$

wherein the R groups are as defined above.

The alcohol product can be isolated by distillation or chromatographic techniques. When tetramethylene is used, $R^1$ is H and $R^2$, $R^3$ and $R^4$ are $CH_3$ in the above formulas. When $R^1$ is phenyl, $R^2$ and $R^3$ are H, and $R^4$ is $CH_3$, the alcohol obtained is 2-(β-styryl)-2-butenol.

Higher alcohols, i.e., where $R^4$ is alkyl only, produced by the reaction of the invention can be isomerized and/or dehydrated by the use of acid catalysts and/or heat. As shown in Example 3, the presence of an acidic ion-exchange resin at room temperature can isomerize the product of reaction of formaldehyde with an allene having a methyl or methylene attached to the 1,3-carbons of the allene, e.g., $$R^1CH=\underset{R^2}{\underset{|}{C}}-\overset{CH_2OH}{\underset{|}{C}}=\underset{R^3}{\underset{|}{C}}-CH_2R^5 \longrightarrow R_1CH=\underset{R^2}{\underset{|}{C}}-\overset{CH_2}{\underset{||}{C}}-\underset{R^3}{\underset{|}{C}}-CHR^5OH$$

wherein $R^5$ is the residue of $R^4$. The rearranged alcohols can be separated by conventional techniques, e.g., distillation and chromatography.

In general, heat dehydrates the rearranged alcohol to give the cross-conjugated triolefin having the structure $$R_1CH=\underset{R^2}{\underset{|}{C}}-\overset{CH_2}{\underset{||}{C}}-\underset{R^3}{\underset{|}{C}}=CHR_5$$

In the latter formula when tetramethylallene is used as the starting material, the novel and useful products have the structures and properties as given in Example 3.

Specific embodiments of the invention

The following examples are illustrative of the invention. All parts and percentages are by weight unless stated otherwise.

EXAMPLE 1

Tetramethylallene and formaldehyde $$CH_3-\underset{CH_3}{\underset{|}{C}}=C=\underset{CH_3}{\underset{|}{C}}-CH + CH_2O \xrightarrow{150°\,C.} CH_2=\underset{CH_3}{\underset{|}{C}}-\overset{CH_2OH}{\underset{|}{C}}=\underset{CH_3}{\underset{|}{C}}-CH_3$$

$$R^1=H$$
$$R^2=R^3=R^4=CH_3$$

tetramethylallene     2-isopropenyl-3-methyl-2-buten-1-ol

A mixture of 6.6 ml. of tetramethylallene and 1.5 g. of vacuum dried polyformaldehyde ("Alkaform" obtained by caustic polymerization of 37% aqeous formaldehyde) was heated at 150° in a sealed tube for 6 hrs. The contents were removed and separated by gas chromatography (using "DC–200" on "Chromsorb"). Isolated were formaldehyde, tetramethylallene (16.9%), 2,4-dimethyl-1,3-pentadiene (12.7%), 2,4-dimethyl-5,6-dihydro-2H-pyran, 1,2 - diisopropylidene - 3,3,4,4 - tetramethylcyclobutane (28.9%) and 2-isopropenyl - 3 - methyl - 2 - buten-1-ol (32.8%). The latter has mass spectrum of M+=126, M—CH=111, M—H$_2$O=108 and M—(CH$_3$+H$_2$O)=93; nmr. δ1.71 (s, 3H), δ1.74 (s, 3H), 1.83 (m, 3H), δ2.72 (s, 1H, removed by D$_2$O), 4.10 (s, 2H), 4.69 (m, 1H), and 5.00 (m, 1H); ir 11.2, 9.9, 7.32, 6.95, 6.12, 3.42 and 3.0µ; $n_D^{24}$=1.4718 and B.P. 174°.

EXAMPLE 2

Tetramethylallene and formaldehyde

Tetramethylallene [288 g. (2.78 moles) of 92.5% purity], 90 g. of alkali-polymerized formaldehyde (3.0 moles) and 10 g. of 1,8-bis-(dimethylamino) naphthalene were charged into a 1-1 stainless steel autoclave and heated under autogenous pressure at 180° C. for six hours, cooled and discharged. Gas chromatographic assay against standards indicated that the product consisted of 30.2% 1,2-diisopropylidene-3,3,4,4-tetramethylcyclobutane,
53.6% 2-isopropenyl-3-methyl-2-buten-1-ol,
6.4% 2-isopropenyl-3-methyl-2-butenyl-1-formate,
2.1% 2,2,4-trimethyl-5,6-dihydro-2H-pyran and
7.7% 2,4-dimethyl-1,3-pentadiene.

Distillation gave 173.6 g., B.P. 96–97° C./3 mm. of substantially pure 2-isopropenyl-3-methyl-2-buten-1-ol corresponding to a yield of 49.5%.

The formate has a fruity odor and is stable at about 150° C.

EXAMPLE 3

Isomerization and dehydration of unsaturated alcohol

[Structure I: 2-isopropylidene-3-methyl-2-buten-1-ol]

[Structures II and III]

A solution of 26.5 g. of 2-isopropylidene-3-methyl-2-buten-1-ol (I) containing about 10% 1,2-diisopropenyl-3,3,4,4-tetramethylcyclobutane in 30 ml. of ether was mixed with 20 g. of "Amberlyst–15" (macroreticulate acidic resin) for 3 days. Distillation gave 4.2 ml. of 2,4-dimethyl-3-methylene-1,4-pentadiene (III) B.P. 96°/760, $n_D^{22}$ 1.4100 (and 0.3 ml. of the same compound, B.P. 31°/49), mass spectrum M=108, M—CH$_3$=93; nmr. δ1.88 (d, 6H), and 4.99 (m, 6H); ir 3.22, 5.52, 6.1, 6.3, 6.95, 7.3, 8.8, 9.92, and 11.2µ; uvλ$_{max}$ 227 mµ (ε=13824).

Analysis.—Calcd. for C$_8$H$_{12}$: C, 88.82; H, 11.18. Found: C, 88.78; H, 11.19.

Further distillation gave 4 ml. B.P. 64°/47 ($n_D^{22}$ 1.4562) and 3.2 ml. B.P. 57–8°/24 ($n_D^{22}$ 1.4578) of 2,4-dimethyl-3-methylene-4-penten-2-ol (II); mass spectrum M+126, and M–H$_2$O=108; nmr. δ1.38 (s, 6H), 1.95 (d, 3H), 2.20 (s, 1H removed by D$_2$O), 4.94 (m, 2H) and 5.18 (m, 1H); ir 2.9, 3.2, 3.34, 6.08, 6.85, 7.3, 8.9, 10.5 and 11.15µ; uvλ$_{max}$ 400–205 mµ.

Analysis.—Calcd. for C$_8$H$_{14}$O: C, 76.14; H, 11.18. Found: C, 75.87; H, 10.32.

Of the residue, about 3 ml. of 1,2-diisopropenyl-3,3,4,4-tetramethylcyclobutane distilled at 61–65°/3 $n_D^{22}$ 1.4922.

EXAMPLE 4

Isomerization and dehydration of unsaturated alcohol

A solution of 100 g. of 2-isopropenyl-3-methyl-2-buten-1-ol in 900 ml. ether was passed through a 17.5 cm. x 10 mm. column of "Amberlyst 15" macroreticulate resin at approximately 3 ml./min. The effluent exclusive of solvent contained 2-isopropenyl-3-methyl-2-buten-1-ol, 2,4-dimethyl - 3 - methylene-4-penten-2-ol and 2,4-dimethyl-3-methylene-1,4-pentadiene in the approximate ratio 2/4/4. Distillation gave an apparent azeotrope of the latter triene and water at a pot temperature of 110° C. and head temperature of 82–84° C. This was dried over magnesium sulfate and redistilled to yield 49.5 g. of this triene, B.P. 100–102° C. and 18 g. of a colorless elastomeric polymer as residue.

EXAMPLE 5

Methylallene and formaldehyde $$R^1=R^2=R^3=R^4=H$$
$$CH_3CH=C=CH_2 + CH_2O \longrightarrow CH_2=C(CH_2OH)CH=CH_2$$
$$\text{I} \qquad\qquad\qquad\qquad \text{II}$$

When the general procedure of Example 2 was repeated with methylallene (I) there was obtained 2-methylene-3-buten-1-ol (II) as shown by gas chromatographic analysis.

EXAMPLE 6

2,3-Pentadiene and formaldehyde $$R'=R^2=R^3=H$$
$$R^4=CH_3$$
$$CH_3CH=C=CHCH_3 + CH_2O \longrightarrow CH_3CH=C(CH_2OH)CH=CH_2$$
$$\text{I} \qquad\qquad\qquad\qquad \text{II}$$

When the general procedure of Example 2 was repeated with 2,3-pentadiene (I), there was obtained 2-vinyl-2-buten-1-ol (II).

EXAMPLE 7

3-Methyl-1,2-butadiene and formaldehyde $$R^1=R^3=R^4=H$$
$$R^2=CH_3$$
$$CH_3C=C=CH_2 + CH_2O \longrightarrow CH_2=C(CH_2OH)C(CH_3)=CH_2$$
$$\phantom{XXXX}|$$
$$\phantom{XXXX}CH_3$$
$$\text{I} \qquad\qquad\qquad\qquad \text{II}$$

When the general procedure of Example 2 was repeated with 3-methyl-1,2-butadiene (I), there was obtained 2-isopropenyl-2-propen-1-ol (II).

The cross conjugated diene III produced in Example 3 can be used in various reactions as shown by the following three examples:

EXAMPLE A

To a solution of 128 mg. tetracyanoethylene in 2 ml. of dioxane was added 108 mg. of 2,4-dimethyl-3-methylene-1,4-pentadiene. There resulted a π complex (in molar ratio, also obtained when more tetracyanoethylene used). The color of the complex slowly discharged and a colorless solid crystallized, M.P. 136–136.5°, nmr. δ 1.82 (s, 6H), 3.06 (s, 4H), 4.85 (s, 1H) and 5.18 (s, 1H).

Analysis.—Calcd. for C$_{14}$H$_{12}$N$_4$: C, 71.17; H, 5.12; N, 23.71. Found: C, 71.20; H, 5.25; N, 23.6.

EXAMPLE B

When 4.32 g. of 2,4-dimethyl-3-methylene-1,4-pentadiene was refluxed for 8 hrs. with 3.92 g. of maleic anhydride in about 25 ml. of acetonitrile, there was obtained a viscous oil after evaporation of acetonitrile. The product has $n_D^{23}$ 1.5071, IR 5.5, 5.68 (C=O), 6.2, 11.2 (C=C), and 10.1, 10.75 (COC). It crystallized to a colorless solid, M.P. 51–52°.

*Analysis.*—Calcd for $C_{12}H_{14}O_3$ (percent): C, 69.89; H, 6.84; O, 23.27. Found (percent): C, 69.43; H, 6.77; O, 23.41.

This corresponds to the structure

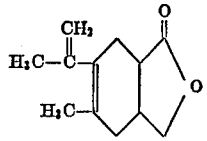

EXAMPLE C

When fractions from Example 3 containing 2,4-dimethyl-3-methylene-1,4-pentadiene were heated at atmospheric pressure and distilled at 96–104° there was obtained a residue in the still pot. This was dissolved in methylene chloride, precipitated and washed with methanol and dried. The product was polymeric (similar to high molecular weight polyisoprene) and had IR absorption at 6.15 and 11.25μ. Treatment of a solution in methylene chloride with tetracyanoethylene gave a Diels-Alder polymeric adduct (after momentary coloration). m-Phenylene-bis-maleimide (10% by weight) of polymer was added to a methylene chloride solution of this polymeric adduct and the solution evaporated to produce a film. When the film was heated a few minutes at 190°, a substantially colorless and insoluble film was obtained.

The various alcohols produced by the invention, as for example, 2-isopropenyl-3-methyl-2-buten-1-ol, can be converted to esters by known methods. Higher esters, e.g. of phthalic acid, are particularly useful as plasticizers, e.g., for polyvinyl chloride. The isomeric alcohol, 2,4-dimethyl-3-methylene-4-penten-2-ol, obtained by acid rearrangement can also be converted to phthalate esters useful as plasticizers for vinyl resins.

The rearranged dehydration product, 2,4-dimethyl-3-methylene-1,4-pentadiene is new and has "cross-conjugation." It homopolymerizes thermally to a high molecular weight elastomeric material e.g. 20,000 (by gel phase chromatography) which is much like polyisobutene but is readily attacked by dienophiles. This elastomeric material can crosslink to a colorless vulcanizate with such materials as the phenylene bis-maleimides. Polymers can be obtained also by anionic and cationic processes. The anionic polymer prepared is not clearly distinguishable from the thermal polymer by nmr but is non-elastomeric with a melting point just over 100° C. Further, it does not readily react with dienophiles. Cationic polymers are of low molecular weight. The nmr data shows they are not 1,2-polymers since 1,2-polymers potentially available would show four vinylic protons while only two appear.

In contract to these properties, a known cross-conjugated olefin, 3-methylene-1,4-pentadiene has not been shown to homopolymerize. A gelatinous material and oily substance were obtained. The latter is presumably the dimer since the monomer was obtained on heating.

The new 3-methylene-2,4-dimethyl-1,4-pentadiene produced in this invention undergoes Diels-Alder addition for example with benzophenone. With the latter, adducts are capable of further self-condensation to give inert polymers.

What is claimed is:

1. The process of producing an unsaturated alcohol which consists essentially in the step of reacting a compound of the formula

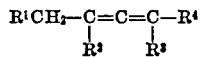

wherein the R groups, alike or different, are selected from the group consisting of hydrogen, alkyl and aryl of up to 7 carbon atoms, with at least an equimolar amount of formaldehyde at a temperature of 150–220° C. under neutral or basic conditions.

2. A process according to claim 1 wherein tetramethylallene is reacted with formaldehyde.

3. A process according to claim 1 wherein methylallene is reacted with formaldehyde.

4. A process according to claim 1 wherein 2,3-pentadiene is reacted with formaldehyde.

5. A process according to claim 1 wherein 3-methyl-1,2-butadiene is reacted with formaldehyde.

6. A process according to claim 1 wherein the reaction temperature is 150° C.

7. A process according to claim 6 wherein the reaction temperature is 180° C.

References Cited
UNITED STATES PATENTS

| | | | |
|---|---|---|---|
| 2,308,192 | 1/1943 | Mikeska et al. | 260—638 R |
| 2,555,918 | 6/1951 | Coffman et al. | 260—618 R |
| 2,624,766 | 1/1953 | Butler | 260—638 R |
| 3,574,773 | 4/1971 | Mueller et al. | 260—638 R |

JOSEPH E. EVANS, Primary Examiner

U.S. Cl. X.R.

252—522; 260—92.8 R, 93.7, 345.1, 346.6, 465 B R, 475 N, 488 J, 618 R, 642, 643 G, 666 P, 682